Feb. 10, 1948.  E. E. ROBERTSON  2,435,846
TOOTH FOR POWER SHOVELS
Filed June 7, 1946

INVENTOR
ELMER E. ROBERTSON
BY *Miner L. Hartmann*
ATTORNEY

Patented Feb. 10, 1948

2,435,846

UNITED STATES PATENT OFFICE 2,435,846

TOOTH FOR POWER SHOVELS

Elmer E. Robertson, Harbor City, Calif.

Application January 7, 1946, Serial No. 639,510

2 Claims. (Cl. 37—142)

This invention relates to a removable tooth and tooth shank assembly for use on a power shovel bucket.

One object of the invention is to provide a removable tooth and tooth shank assembly for a power shovel bucket. Another object is to provide a wear-resisting removable tooth which may be reversed on the tooth-holding shank so as to equalize the wear. Still another object is to provide simple and secure means for joining a removoble tooth to a cooperating tooth shank on a power shovel bucket.

These and other objects are attained by my invention which will be more fully described below, reference being made to the accompanying drawings in which.

Figure 1:
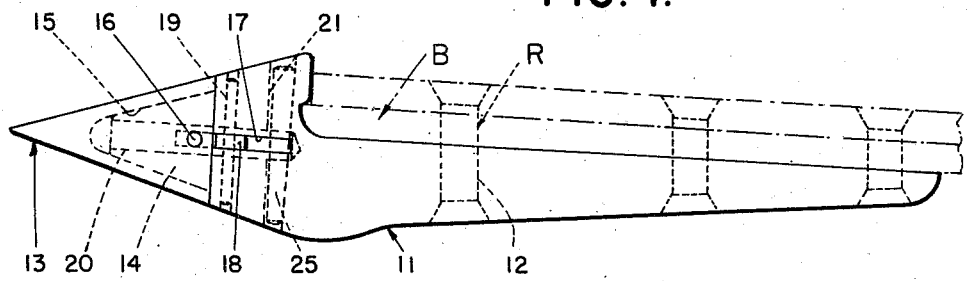
Fig. 1 is a side elevational view of my removable tooth and tooth shank.
Figure 2:
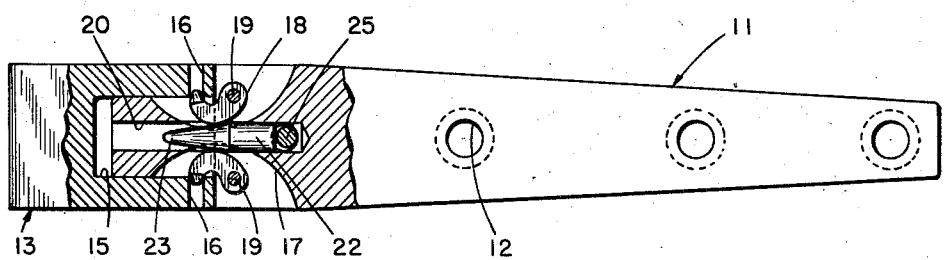
Fig. 2 is a top elevational view of the same, partly in section.
Figure 3:
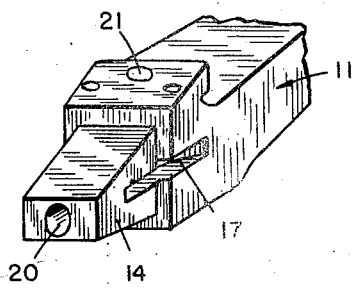
Fig. 3 is a fragmentary perspective view showing the end of the shank to which the removable tooth is attached.
Figure 5:
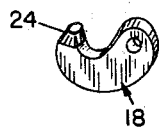
Fig. 5 is a perspective view showing the latch member.
Figure 7:
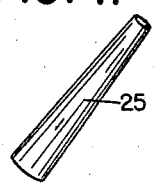
Fig. 7 is a perspective view showing the drive wedge member.
Figure 6:
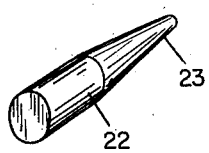
Fig. 6 is a perspective view showing the tapered pin for actuating the latch members.
Figure 4:
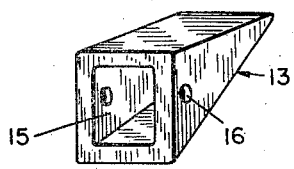
Fig. 4 is a perspective view showing the recessed removable tooth.

Referring to the drawings, my device consists of a tooth shank 11 which is shown attached to the bottom of a power shovel bucket, indicated at B, by rivets R in the countersunk holes 12, and a steel tooth structure 13 which is adapted to be attached to the forward end 14 of the tooth shank 11, which extension consists of a V-shaped tapered portion adapted to fit in a recess 15 formed in the forged steel tooth structure 13. The recess 15 in the tooth 13 is provided with holes 16 in opposite walls of the recessed portion, these walls being of sufficient thickness to be used to secure the tooth to the shank by the locking means formed in the shank extension 14. Grooves 17 are cut in opposite sides of the shank extension 14 which grooves are adapted to enclose a pair of latch members 18 which are pivoted on the pivots 19 in the walls of the grooves 17. The latch members are shaped and pivoted so that the free ends may be moved out of the groove 17 for a sufficient distance to engage the holes 16 on opposite side walls of the recess 15. An axial hole 20 is provided in the forward end of the shank and extends rearwardly across and beyond a wedge hole 21 at right angles thereto in the rear portion of the forward end of the shank, and extending from the top to the bottom of the shank. A round pin 22 movably fitting in the hole 20 is provided with a tapered end portion 23 which engages the back curved surface of the latch members 18 to move the free end 24 thereof into the holes 16 of the tooth. The pin 22 is actuated by means of a wedge pin 25 which is driven into the hole 21 in the rear portion of the shank-head against the end of the latch operating pin 22.

In order to remove the tooth from the shank, the wedge 25 is driven out, thus releasing the pin 22 whose tapered end 23 holds the latch members 18 in engagement in the holes 16 in the walls of cavity of the tooth. In order to remount the tooth, for example, after turning it over to compensate for wear on one side, or in replacing it with a new tooth, the tooth cavity is fitted over the forward end of the shank and the latch members are brought into engagement with the holes 16 by moving the tapered end 23 of the pin 22 by means of the wedging action of the wedge pin 25 driven in the hole 21 in the rear portion at the head of the shank.

The removable tooth is preferably made in a single piece by forging a steel bar to the desired shape, including the cavity.

The advantages of my removable tooth structure will be apparent. The tooth portion may be easily replaced on the shank by simply driving out the wedge 25 which releases the latch engagement in the holes in the cavity of the tooth structure and a replacement tooth may be attached by merely driving the wedge in place again. No special tools are required which are not readily available in the field and the changes of teeth may be made by almost any workman who might be available. The tooth may be turned over to compensate for the extra wear on the bottom side, as the cavity and shank extension are symmetrical on a bisecting plane longitudinally through the latch members and slots.

I claim:

1. A removable tooth and tooth shank assembly for a power shovel bucket comprising a removable wear-resisting tooth having a narrow forward end and a thick rear end with a cavity in the rear end having walls at the sides of the tooth, and holes in opposite side walls of said cavity adapted to be engaged by latch members for holding the tooth on the tooth shank; and a shank member provided with means for nonremovably fastening the shank to a power shovel bottom, said shank member also having a tooth-cavity-fitting extension and locking means on the forward part thereof, said locking means consisting of latch members pivoted in slots in opposite sides of said extension, said latch members having free ends adapted to enter and engage the holes in the sides of said tooth cavity, a tapered pin adapted to slide in a hole extending from the forward end of said shank extension beyond the rear end of said tooth, and a wedge pin adapted to be driven into a hole in said shank at right angles to said tapered pin hole, for wedging the rear end of said tapered pin to move said latch members into engagement with said holes in said tooth.

2. A removable tooth and tooth shank assembly for a power shovel bucket comprising a removable tooth with a cavity in the rear end having walls at the sides of the tooth, and holes in opposite side walls of said cavity; and a shank member having a tooth-cavity-fitting extension and locking means on the forward part thereof, said locking means consisting of latch members pivoted in slots in opposite sides of said extension, said latch members having free ends adapted to enter and engage the holes in the sides of said tooth cavity, and means operable from outside said cavity and shank extension for holding said latch free ends in said holes in the tooth cavity walls.

ELMER E. ROBERTSON.

REFERENCES CITED

The following references are of record in the file of this patent:

UNITED STATES PATENTS

| Number | Name | Date |
|---|---|---|
| 1,856,930 | Robin | May 3, 1932 |